Oct. 20, 1931.　　　A. B. SANDERS　　　1,828,707
ADJUSTABLE CONNECTION FOR STEERING GEAR MEMBERS
Filed Aug. 20, 1928　　　2 Sheets-Sheet 1
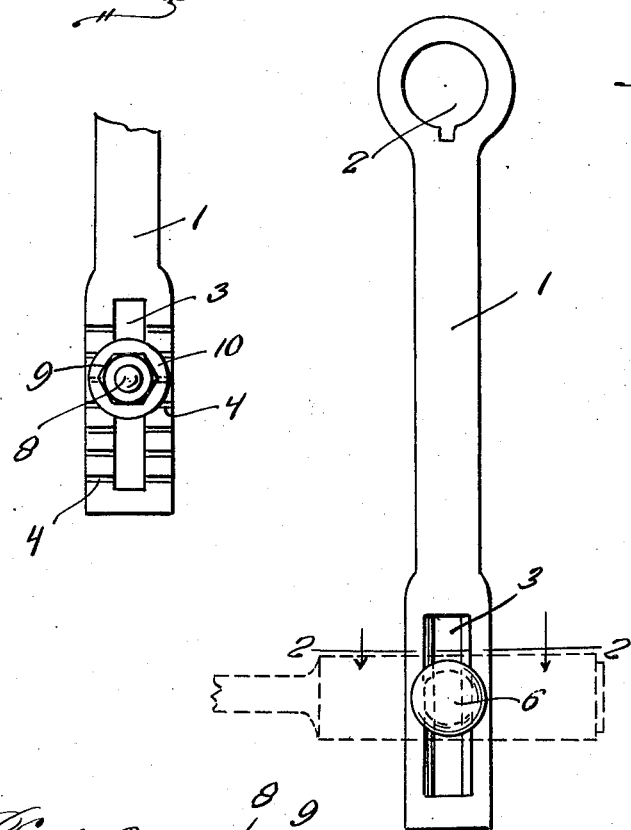
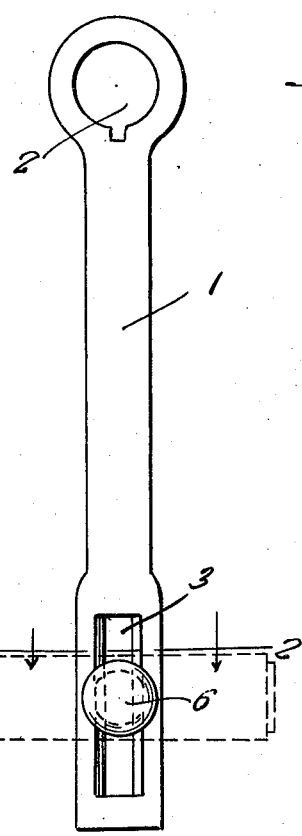
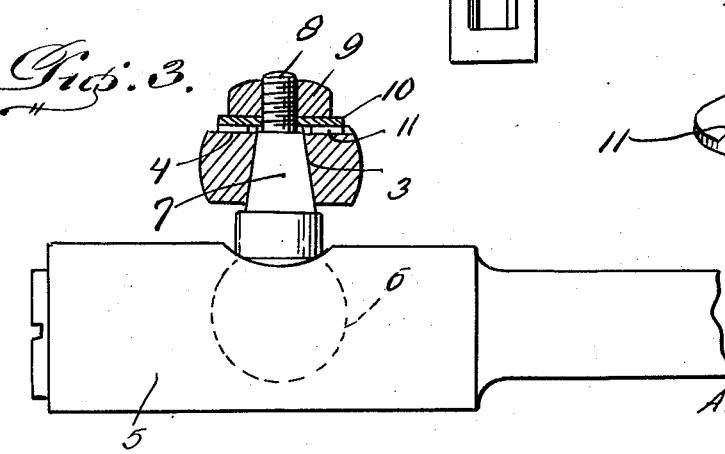
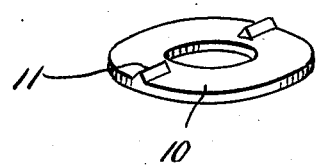
Inventor
Alfred B. Sanders
By Clarence A O'Brien
Attorney Oct. 20, 1931.   A. B. SANDERS   1,828,707
ADJUSTABLE CONNECTION FOR STEERING GEAR MEMBERS
Filed Aug. 20, 1928   2 Sheets-Sheet 2
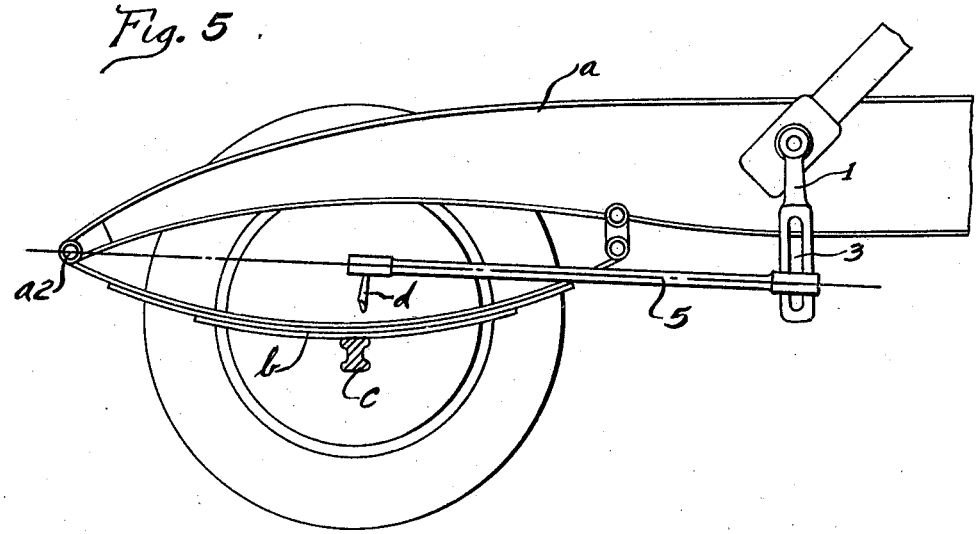
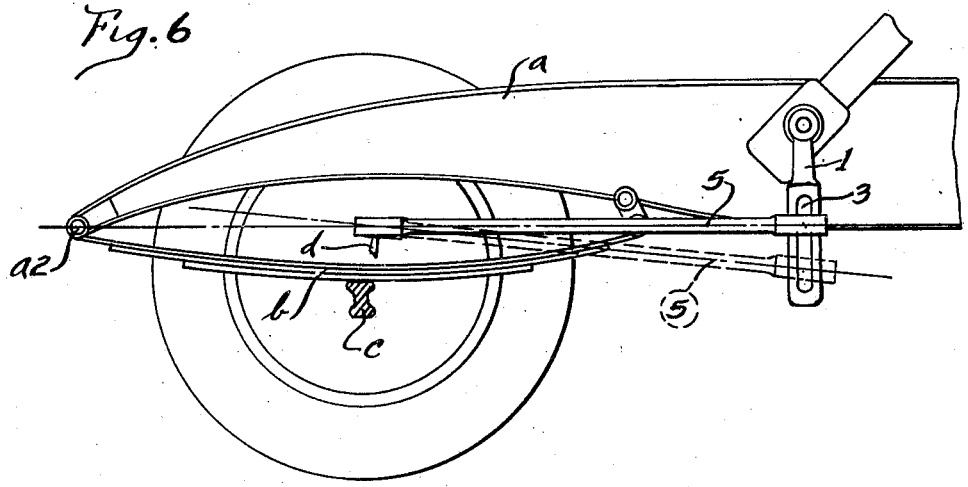
INVENTOR.
ALFRED B. SANDERS
BY Swan & Frye
ATTORNEY.

Patented Oct. 20, 1931

1,828,707

UNITED STATES PATENT OFFICE

ALFRED B. SANDERS, OF PONTIAC, MICHIGAN, ASSIGNOR OF ONE-TENTH TO THE AMERICAN FORGING AND SOCKET COMPANY, OF PONTIAC, MICHIGAN, A CORPORATION OF MICHIGAN

ADJUSTABLE CONNECTION FOR STEERING GEAR MEMBERS

Application filed August 20, 1928. Serial No. 300,749.

My invention relates to steering gears and an object of my improvements is to obviate the strains upon the parts, the transmission of road shocks and the wavering or wabbling of the steering wheels, due to the displacement of the parts caused by the relative vertical movement of the chassis and axle after the settling of the springs.

In the accompanying drawings:—

Figure 1 is an elevation showing a steering arm or crank lever, used in the embodiment of my invention and my preferred means for connecting the drag link with said arm. The drag link being fragmentarily shown in dotted lines.

Figure 2 is a fragmentary view showing a portion of the back of said arm at the end thereof, which is attached to the drag link.

Figure 3 is an enlarged detail section on the line II, II, of Figure 1, showing the arm, the drag link and the connection between the arm and the link.

Figure 4 is an enlarged perspective view of my preferred form of washer, as comprised in said connection.

Figure 5 is an elevation, partly in section of the front portion of an automobile illustrating my invention, with the parts in their normal position.

Figure 6 is a view similar to Figure 5, showing the parts in their position after the settling of the spring. The end of the drag link having been adjusted to the new relative position of the parts.

Referring now to the drawings:—

The steering arm 1, when constructed in my improved form is adapted to be connected at its upper end in a conventional manner, as by a spline connection 2, to the shaft of an automobile steering mechanism.

The opposite end portion of said arm 1, I preferably form with a straight slot 3 therein, extending longitudinally thereof, as shown, the said slot being tapered in cross section as clearly brought out in Figure 3. One face of the slotted portion of the arm 1, is formed with transverse notches extending upon opposite sides of the slot, as designated by 4, and best shown in Figure 2.

The drag link of the steering mechanism, designated 5, is of usual construction and the means for connecting said drag link in proper working manner to the arm 1 is made up of a ball 6, with a tapered shank 7 terminating in a reduced and threaded portion 8, said tapered shank being wedged in the slot 3, a nut 9 on the shank portion 8 and a washer 10 also on said shank portion and interposed between the nut and the notched side of the arm and having teats or projections 11 adapted to seat in the notches 4 of the arm 1.

Manifestly, with the ball 6 in the complementary socket of the drag link 5 and secured to the arm 1 in the manner just described, with the ball shank 7, nut 9 and washer 10 relatively arranged as shown in Figures 1, 2, and 3, the ball 6 will be positively and strongly fixed with respect to the arm 1, but yet the desired position between the ball 6 and the end of the arm 1 may be varied after which the ball carrying member, may be again fixed to the arm 1, by means of the nut 10, as above described.

$a$ is the front portion of a side piece of an automobile and $b$ is a front spring secured at its forward end to the forward end of the side piece $a$, by a pivotal joint $a^2$. $c$ is the front axle and $d$ is a knuckle arm.

When the automobile is new the parts are approximately in the position illustrated in Figure 5, in which the drag link 5 is approximately parallel to the spring $b$ between the axle $c$ and joint $a^2$ and the relative vertical movement of the axle $c$ and the chassis $a$, due to the roughness of the road or other cause, will have but little tendency to move the knuckle arm $d$, but when the spring has settled, as illustrated in Figure 6, the drag link 5 is carried down to the position shown in broken lines in Figure 6, and the relative vertical movement of the side piece $a$ and the shaft $c$, moves the outer end of the knuckle arm $d$, causing the steering wheels to wabble and places considerable strains upon the parts.

I have found that this universally observed effect can be obviated by changing the relative positions of the link 5 to that shown in full lines in Figure 6. To this end I loosen the pivotal connection between the drag link and steering arm 1, and move the attachment along the slot 3 and again secure the connection where the drag link 5 is again approximately parallel to the part of the spring between the axle and front pivotal connection of the spring with the chassis position as shown in full lines.

I have discovered that this will obviate the wabbling and strain of the parts, which have been generally observed, but a remedy for which has either not been known or has been of too complicated a construction for general use.

The relative positions of the spring and drag link will also be observed. That is to say, the center line of the drag link continued passes through the center of the pivotal joint $a^2$, as illustrated in Figures 5 and 6, so that said link is approximately parallel to the part of the spring between said joint and the axle.

While it is apparent that the illustrated embodiment of my invention herein disclosed is well calculated to adequately fulfill the objects and advantages above stated, it is to be understood that the invention is susceptible to variation, modification and change within the spirit and scope of the subjoined claim.

I claim:—

In an automobile the combination of an axle, a chassis, a spring that has become deformed in use so that the drag link is in a relative position as to the other parts that causes irregularity of movement of the steering wheels, a knuckle arm on said axle, a steering arm depending from the chassis, and a drag link attached at one end to said knuckle arm and at the other end attached adjustably to said steering arm longitudinally thereof and capable of being moved and secured at a point of the latter at which said irregularity of movement of the steering wheels is obviated.

In testimony whereof I affix my signature.

ALFRED B. SANDERS.